(12) United States Patent
Schroth et al.

(10) Patent No.: US 8,317,262 B2
(45) Date of Patent: Nov. 27, 2012

(54) SEAT ASSEMBLY FOR A LAND VEHICLE, SEA VESSEL, OR AIRCRAFT

(75) Inventors: Carl-Jürgen Schroth, Soest (DE); David Hayward, Sudbury (GB)

(73) Assignee: Schroth Safety Products GmbH, Arnsberg (DE)

( * ) Notice: Subject to any disclaimer, the term of this patent is extended or adjusted under 35 U.S.C. 154(b) by 296 days.

(21) Appl. No.: 12/681,029

(22) PCT Filed: Sep. 26, 2008

(86) PCT No.: PCT/DE2008/001586
§ 371 (c)(1), (2), (4) Date: Mar. 31, 2010

(87) PCT Pub. No.: WO2009/046694
PCT Pub. Date: Apr. 16, 2009

(65) Prior Publication Data
US 2010/0219666 A1 Sep. 2, 2010

(30) Foreign Application Priority Data
Oct. 9, 2007 (DE) .......................... 10 2007 048 486

(51) Int. Cl.
*B60N 2/42* (2006.01)
*B60N 2/427* (2006.01)

(52) U.S. Cl. ........... 297/216.1; 297/216.16; 297/216.17; 297/276; 297/277; 297/278; 297/281; 297/282; 297/313

(58) Field of Classification Search ............... 297/216.1, 297/216.13, 216.14, 216.15, 216.16, 216.17, 297/216.18, 216.19, 216.2, 344.12, 273, 297/276, 277, 278, 281, 282, 313, 314
See application file for complete search history.

(56) References Cited

U.S. PATENT DOCUMENTS

| | | | |
|---|---|---|---|
| 2,829,702 A | | 4/1958 | Keating |
| 3,314,720 A | * | 4/1967 | Millington et al. ........ 297/216.1 |
| 3,868,143 A | | 2/1975 | Reilly |
| 4,005,765 A | * | 2/1977 | Reilly .................... 297/216.1 X |
| 4,474,347 A | * | 10/1984 | Mazelsky ............... 297/216.1 X |
| 5,451,094 A | * | 9/1995 | Templin et al. .......... 297/216.17 |
| 5,570,929 A | * | 11/1996 | Glockl ......................... 297/313 |
| RE37,123 E | * | 4/2001 | Templin et al. .......... 297/216.17 |
| 6,257,663 B1 | * | 7/2001 | Swierczewski ......... 297/216.19 |
| 6,322,140 B1 | * | 11/2001 | Jessup et al. ............. 297/216.17 |

(Continued)

FOREIGN PATENT DOCUMENTS
DE 43 03 719 A1 8/1994
(Continued)

*Primary Examiner* — Rodney B White
(74) *Attorney, Agent, or Firm* — Henry M. Feiereisen, LLC

(57) ABSTRACT

The seat assembly (1) for a land vehicle, sea vessel, or aircraft comprises a vertically adjustable seat (4) supporting the buttocks of a user and a plurality of cables (9-12) disposed between the seat (4) and structural parts (8) of the vehicle. The seat (4) forms at least indirectly the component of a platform (2), which can be displaced along the cables (9-12) and fixed in the respective position on the cables (9-12). The cable sections (9a-12a, 9b-12b) located above and beneath the platform (2) extend between the platform (2) and the structural parts (8) such that they either point toward the vertical center axis (MA) of the platform (2) or are directed away therefrom. The cables (9-12) can be guided via at least one height adjustment device.

16 Claims, 7 Drawing Sheets

U.S. PATENT DOCUMENTS

| | | | |
|---|---|---|---|
| 6,481,777 B2* | 11/2002 | Mans | 297/216.1 X |
| 6,582,015 B2* | 6/2003 | Jessup et al. | 297/216.17 |
| 6,913,314 B2 | 7/2005 | Hansen | |
| 7,293,818 B2 | 11/2007 | Kumpf et al. | |
| 7,513,558 B2* | 4/2009 | Hansen | 296/68.1 |
| 7,513,575 B1* | 4/2009 | Go | 297/216.13 X |
| 7,744,155 B2* | 6/2010 | List et al. | 297/216.17 |
| 7,758,095 B2* | 7/2010 | Elhanany | 296/63 |
| 8,011,730 B2* | 9/2011 | Greenwood | 297/344.18 |
| 8,091,944 B2* | 1/2012 | Elhanany | 296/63 |
| 8,109,563 B2* | 2/2012 | Hansen | 297/14 |
| 8,132,838 B2* | 3/2012 | Greenwood et al. | 296/63 |
| 2010/0102602 A1* | 4/2010 | Hansen | 297/216.1 |
| 2010/0109393 A1* | 5/2010 | Hansen | 297/216.1 |
| 2010/0283298 A1* | 11/2010 | Hansen | 297/216.16 |
| 2011/0018319 A1* | 1/2011 | Brown et al. | 297/216.17 |
| 2011/0018320 A1* | 1/2011 | Schneider et al. | 297/216.17 |
| 2011/0285184 A1* | 11/2011 | Greenwood | 297/216.1 |
| 2011/0291454 A1* | 12/2011 | Greenwood | 297/344.12 |

FOREIGN PATENT DOCUMENTS

| | | |
|---|---|---|
| DE | 100 08 258 A1 | 9/2001 |
| DE | 103 41 483 B3 | 3/2005 |
| EP | 1 398 205 A2 | 3/2004 |
| EP | 1 593 542 A | 11/2005 |
| WO | WO 2007/031216 | 3/2007 |

* cited by examiner

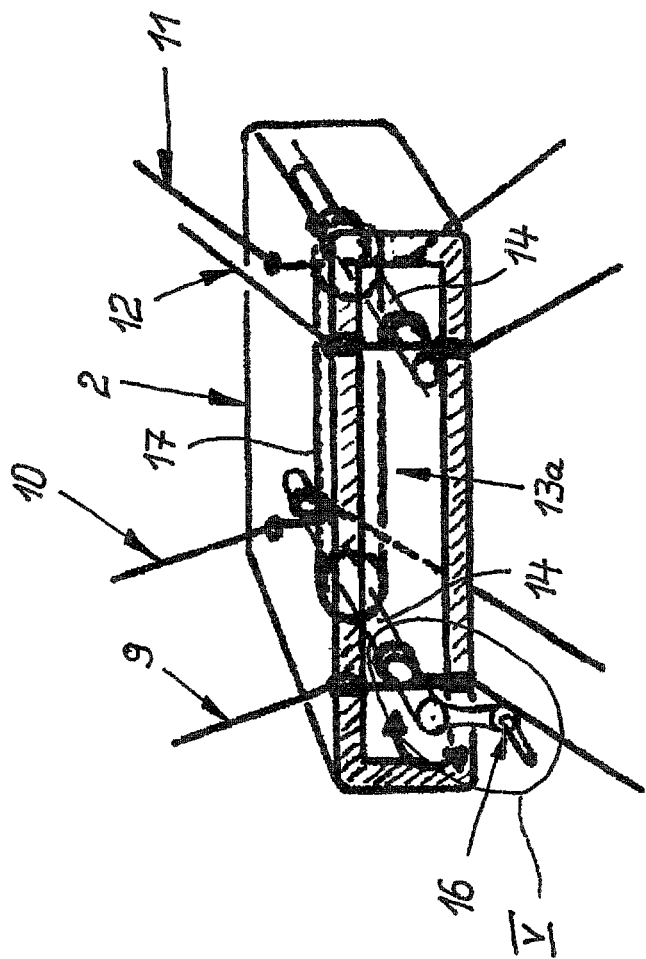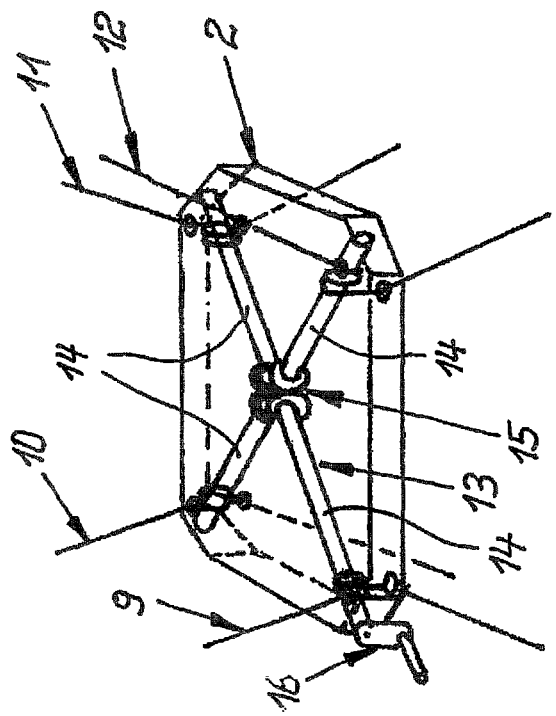

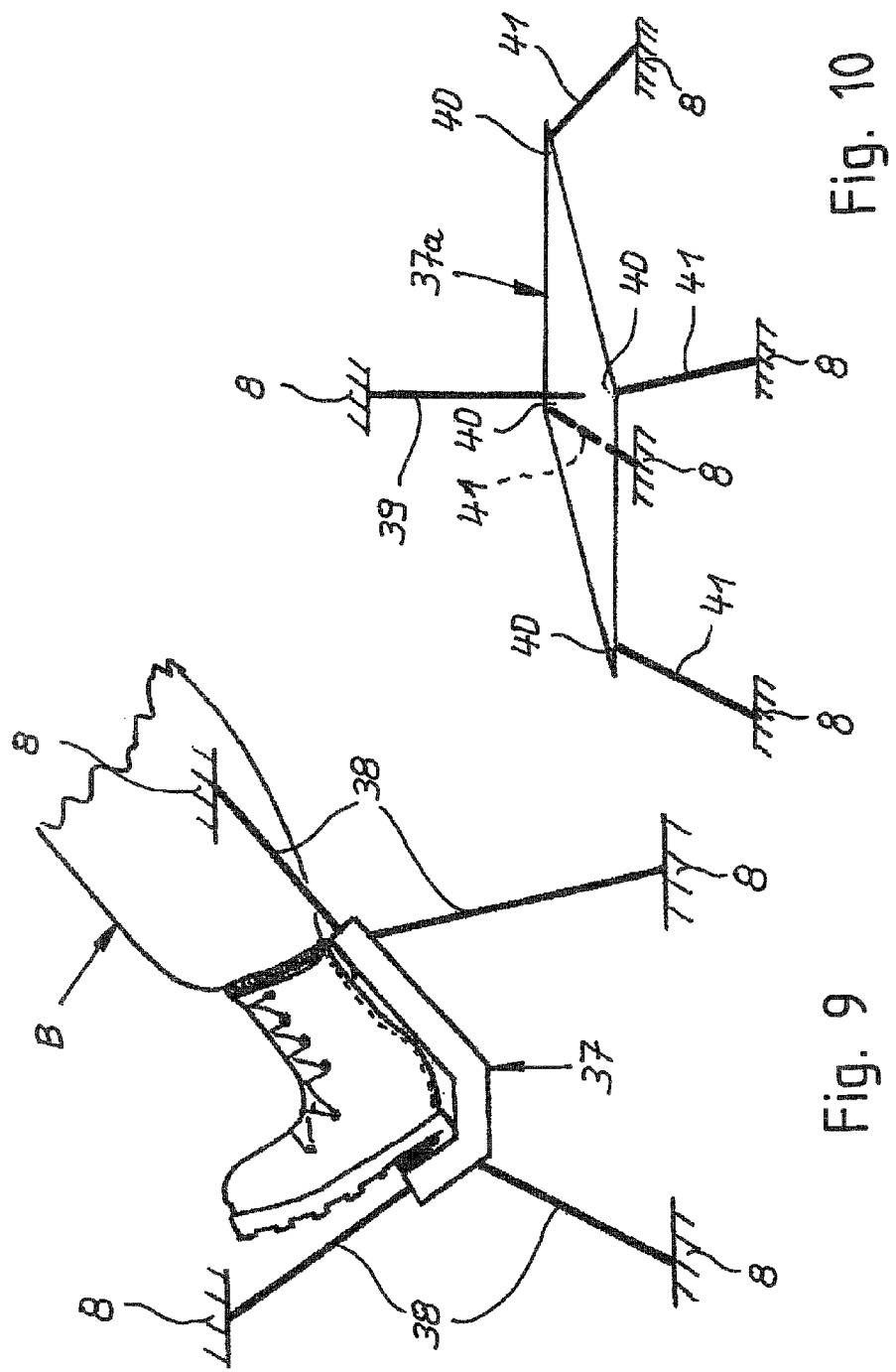

SEAT ASSEMBLY FOR A LAND VEHICLE, SEA VESSEL, OR AIRCRAFT

CROSS-REFERENCES TO RELATED APPLICATIONS

This application is the U.S. National Stage of International Application No. PCT/DE2008/001586, filed Sep. 26, 2008, which designated the United States and has been published as International Publication No. WO 2009/046694 and which claims the priority of German Patent Application, Serial No. 10 2007 048 486.2, filed Oct. 9, 2007, pursuant to 35 U.S.C. 119(a)-(d).

BACKGROUND OF THE INVENTION

The invention relates to a seat assembly for a land vehicle, sea vessel, or aircraft.

Such a seat assembly forms part of the state of the art within the scope of DE 103 41 483 B3. Firstly, it includes harnesses known from motor vehicles consisting of shoulder and pelvic belts which can be interconnected in a central belt lock. The shoulder and pelvic belts are connected to obliquely-extending longitudinal belts, which, at their lower ends, are coupled by a belt loop passing underneath the buttocks of a user. In addition, in the lower and upper region of the longitudinal belts two back belts are located connecting the longitudinal belts. The upper ends of the longitudinal belts are connected to belt retractors. From the lower ends of the longitudinal belts retaining belts extend obliquely forwardly, viewed in the direction of movement of the vehicle, terminating likewise at belt retractors. The belt loop passing underneath the buttocks of a user is likewise connected to a belt retractor by a retaining belt extending downwardly. Furthermore, a retaining belt extends rearwardly between the upper back belt towards a further belt retractor.

All belt retractors are coupled via control lines to a control box comprising a control lever. Via the control lever the user can set up a free-running state allowing a free belt strap extension and free belt strap retraction, a complete locking state of all belt retractors both against belt strap extension as well as belt strap retraction as well as a locking state of the belt retractors against belt strap extension with free belt strap retraction.

The known seat assembly thus only allows a level adjustment of the belt loop passing underneath the buttocks. Apart from the actual harness, it furthermore requires altogether at least six further belt straps in order to tighten the seat assembly in a vehicle reasonably firmly. In addition, the belt straps require considerable pre-tensioning in order to avoid a rocking motion. However, this state of affairs is in conflict with an individual, constantly available, user-friendly adjustment. Moreover, the belt straps required for the seat assembly are relatively wide and, in many applications, obstruct the view onto operating and display devices in the respective vehicle. Finally, practice has shown that the known fully-textile seat assembly proves very uncomfortable after prolonged use and may, in particular, result in strangulations at the lower extremities of a user.

A textile safety seat for vehicles, in particular in aviation and navigation, is known from DE 43 03 719 A1 which comprises a seat surface, back and side members as well as a safety belt for securing the passengers to be transported. The safety seat is designed as a textile cover encompassing the body of the passenger at the back and on the sides to above head level and includes an entrance, the cover being adapted to be accommodated above and underneath by fastening belts fixed thereon between fastening points, provided on the floor and in the ceiling region of the vehicle in fixed relationship with the vehicle.

From EP 1 398 205 A2 a safety seat is known which can be fitted between the floor and ceiling region of a land vehicle, aircraft or sea vessel by tensioning belts provided above and beneath the seat. The safety harness consists of two pelvic belts as well as two shoulder belts extending from the pelvic belts, and an actuating means in the extension region of the shoulder belts, guided under the seat part towards the entrance region of the seat part. Between each of the shoulder belts and the front tensioning belts a tensioning belt is fitted in resilient manner. This serves to enhance the freedom of movement of the passenger and, in particular, to simplify fastening and unfastening the safety harness.

A further seat assembly forms the subject of U.S. Pat. No. 7,293,818 B2. The latter provides fitting a seat with a rigid frame in an armored vehicle, the said frame being completely decoupled from the vehicle floor, so that in the event of a land mine exploding underneath the vehicle, the forces are not directly transmitted from the vehicle floor to the seat.

A further embodiment of a suspended seat is disclosed in U.S. Pat. No. 3,868,143 A. It is represented by a seat assembly which is fitted both to the floor as well as in the ceiling region by a plurality of tensioning belts.

SUMMARY OF THE INVENTION

Proceeding from the state of the art—it is the object of the invention to provide a seat assembly for land vehicles, sea vessels or aircraft by means of which a user can be protected against vibrations as well as against vertically upwardly-directed acceleration forces and vehicle floor deformations, for example due to mine explosions, with generous adjustability for an adaptation to various user body sizes.

This object is attainable according to the invention by a seat assembly for a land vehicle, sea vessel, or aircraft, including a vertically adjustable seat passing underneath the buttocks of a user, as well as a plurality of flexible connections disposed between the seat and structural parts of the vehicle, wherein the seat forms, at least indirectly, a component of a platform, which can be displaced along connections in the form of cables anchored to the structural parts of the vehicle as well as fixed in the prevailing position on the cables, the cable sections of the cables located above and beneath the platform extending between the platform and the structural parts in such a manner that they are either directed towards the vertical centre axis of the platform or are directed away therefrom.

According to the invention, a stable platform is used which itself is directly configured as a seat or on which a seat can be arranged. The platform is positionally adjustable along cables and fixable in the respective position on the cables. The cables, in their turn, are secured to suitable structural parts of the respective vehicle by way of their upper and lower end sections. It is a further important feature that the cable sections of the cables located above and beneath the platform extend between the platform and the structural parts in such a manner that they are either directed toward the vertical centre axis of the platform or are directed away therefrom.

In the context of the invention it is significant that the platform can be so fixed in place and tensioned by cables in the interior of a vehicle that a user is not only protected against vibrations, but also, preferably in military vehicles (tanks), specifically against vertically upwardly-directed acceleration forces and against vehicle floor deformations due to mine explosions. The seat assembly nevertheless ensures full adjustability for operational adaptation to various body sizes of the user.

The positionally-fixed spatial positioning of the platform can be adjusted in a user-compliant manner via the bracing angles of the cable sections extending above and beneath the platform relative to the platform. In this context, it is only important that all cable sections are uniformly either directed away from the vertical centre axis of the platform or are directed towards the centre axis. As a result thereof, the cable sections each form the edges of a fictitious pyramid which may be equilateral or non-equilateral. Due to varying tension on cables not extending at the same angle in relation to the platform, the inwardly-directed vectors can nevertheless extend through a defined location of the platform and thus bring about the desired position of the platform in space. This allows the invention to be used also in vehicles in which no symmetrical arrangement of the fixation points is provided.

An advantageous further development of the basic concept according to the invention involves the provision of an energy converter, at least indirectly, in the longitudinal orientation of a cable. Preferably, it is the purpose of all energy converters, for example in the case of a mine explosion, to ensure a controlled downward sliding of the platform by converting energy. The energy converter may, for example, be designed as a torsion bar converter, friction converter or a differently configured metal converter.

In this context, it is advantageous that the energy converters are placed under the influence of load-reacting sensors which are integrated in the seat or the anchoring points of the cables on the structural parts. Such sensors are able to detect the mass of the respective user and control the energy converters, adjustable in relation to their load level, in such a manner that optimal energy conversion, which is calculated according to the spatial limitation in the vehicle, takes place at all times.

According to another feature of the invention, the cables are guided by at least one level-adjusting device for the platform. By means of the level-adjusting device the platform may consequently be displaced both parallel in upward and downward direction as well as varied with regard to its inclination.

According to another feature of the invention, the level-adjusting device can be actuated manually or by an electric or hydraulic drive means. Manual actuation may, for example, be done by way of a crank mechanism.

Preferably, the level-adjusting device is integrated in the platform. It may, however, also be provided underneath the platform. In particular, a variation of the inclination of the platform is possible without any difficulty, if two level-adjusting devices are used on the front and rear cables, viewed in the direction of movement of the vehicle.

If an energy converter is integrated in a level-adjusting device, the latter may preferably comprise a crank mechanism. The crank mechanism has an irrotationally arranged gear wheel and is fixed by a blocking device in a respectively desired position in relation to the platform. The cables each loop around a shaft of the level-adjusting device. In the looping region of the cables the shaft is so designed either by special molding or by a friction-enhancing surface that a perfect force-fitting relationship between the cables and the shaft is brought about. The energy converter is then integrated between the blocking device and the looping region of the cables.

In order to fix the respective level of the platform, clamping/release means provided on the platform are associated with the cables. For this purpose, a counter-bearing is provided on one side of a cable and clamping members on the other side thereof. The clamping members can be lifted off the cables by a release unit, which is so configured that a clamping action is cancelled only in the direction in which the platform is to be displaced along the cables. The clamping/release means permits a user to very rapidly plunge from a higher into a lower seating position, should this be necessary for safety reasons, for example from a look-out position in a tank into the protecting interior thereof.

According to another feature of the invention, in order to support the pelvic- and kidney regions of a user and in order to create a large-surface backrest, textile pelvic- and back bracings are provided between the rearward cable sections, viewed in the direction of movement of the vehicle, located above the platform. The back bracing may in this context consist of a wide cloth while for the pelvis preferably one or two narrower belt straps are provided between the cable sections.

According to another feature of the invention, it is, however, also conceivable to provide a molded part, adapted to the back region of a user, between the rearward cable sections, viewed in the direction of movement of the vehicle, located above the platform. This molded part is then of an ergonomic and/or safety-promoting shell-like configuration.

In addition, it is advantageous to provide textile pelvic- and shoulder bracings between the lateral cable sections, located one behind the other, viewed in the direction of movement of the vehicle, and provided above the platform. These bracings serve as lateral support of a user in the pelvic- and shoulder regions.

In this context, it is then advantageous that the shoulder bracings are of net-like design. Such bracings permit laterally-directed vision of the user and also better communication with other passengers.

If a seat, in particular an ergonomic seat, which is displaceable in the direction of movement of the vehicle and fixable in the respective position, is provided on the platform, this seat can then be connected to the platform via rails and displaced along the rails.

According to another feature of the invention, it is possible for such seat to be level-adjustable in relation to the platform.

It is further conceivable that the seat is transversely adjustable on the platform, at least to a limited extent.

According to another feature of the invention, the backrest inclination of the seat can be adjusted so that user comfort is increased.

In order to also adequately protect the foot region of a user, it is appropriately provided that, viewed in the direction of movement of the vehicle, a footrest is arranged upstream of the platform, which is supported in a height and/or inclination-adjustable manner, as the case may be, by cables secured to the structural parts of the vehicle. The footrest may be of ergonomic design. It may, however, also merely consist of a simple platform.

Finally, the seat can be equipped, at least indirectly, with restraining belts. These may in this context be represented by a seat-integrated restraining system or restraining systems may be used which are provided on the vehicle body.

BRIEF DESCRIPTION OF THE DRAWING

The invention is elucidated in more detail in what follows by way of the embodiments illustrated in the drawings.

There are shown in:

FIG. 3 again in a schematic perspective view a level-adjusting device for the seat assemblies according to FIGS. 1 and 2;

FIG. 4 in a schematic perspective view, partially in section, a further embodiment of a level-adjusting device for the seat assemblies according to FIGS. 1 and 2;

FIG. 9 in a side elevation, shown schematically, a footrest for a seat assembly according to FIG. 1, 2, 7 or 8 and FIG. 10 in a schematic perspective view a further embodiment of a footrest for the seat assemblies of FIG. 1, 2, 7 or 8.

DETAILED DESCRIPTION OF PREFERRED EMBODIMENTS

Figure 1:
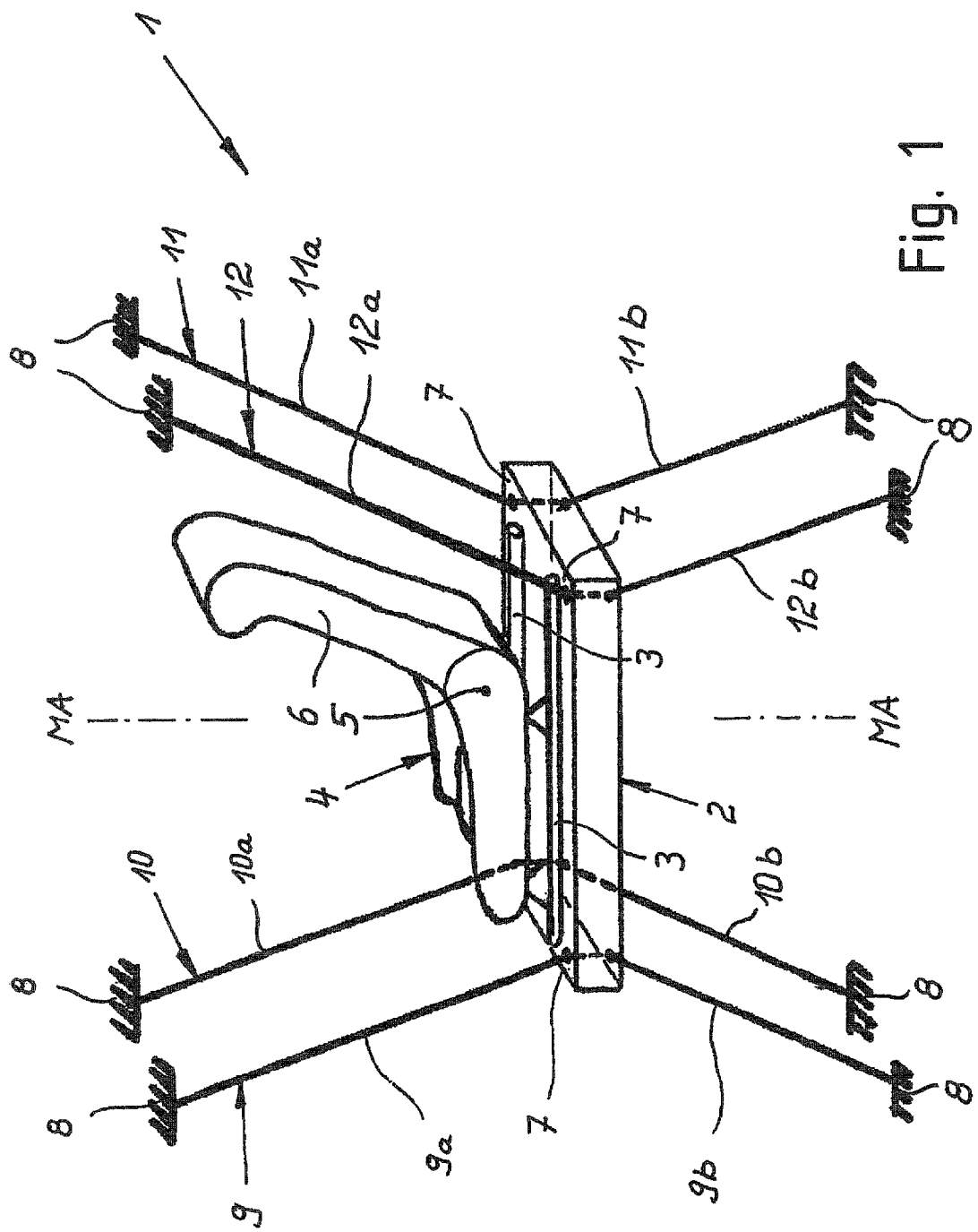
FIG. 1 in a schematic perspective view a seat assembly for a land vehicle, sea vessel or aircraft.

In FIG. 1 a seat assembly for a land vehicle, sea vessel or aircraft, not illustrated in more detail, is denoted by 1. Such a vehicle may, for example, be represented by a military vehicle, such as a tank.

The seat assembly 1 comprises a stable rectangular platform 2. On the platform 2 rails 3 are provided, alongside which a seat 4 for a user, not illustrated in more detail, can be secured in a displaceable manner and in any particular position. The seat 4 is designed to be ergonomic and comprises a backrest 6 the inclination of which can be varied about an axis 5.

The platform 2 can be displaced in its corner regions 7 along cables 9, 10, 11, 12, anchored to the structural parts 8 of the vehicle, as well as positionally secured in the respective position to the cables 9-12 in a manner to be described in more detail below. In the embodiment of FIG. 1 the cable sections 9a-12a, 9b-12b respectively, extend above and beneath the platform 2 in such a manner that—starting from the platform 2—they are directed away from the vertical centre axis MA of the platform 2. As shown, the cable sections 9a-12a, 9b-12b, located above and beneath the platform 2, run parallel to one another. However—starting from the platform 2—they may also be so arranged that, on the one hand, the cable sections 9a-12a above the platform 2 and, on the other, the cable sections 9b-12b underneath the platform 2 form the longitudinal edges of a fictitious pyramid, as it were.

Figure 2:
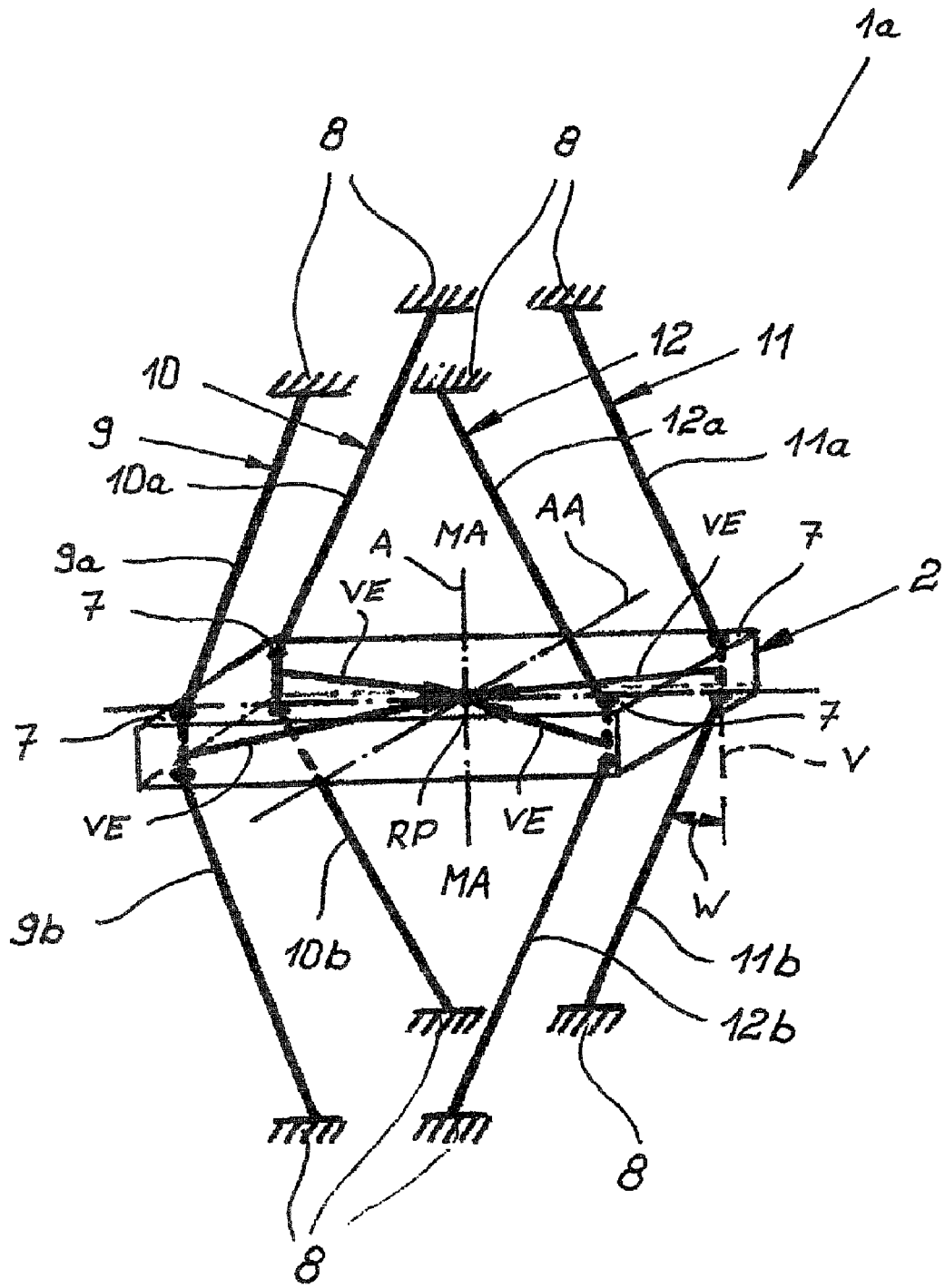
FIG. 2 likewise in a schematic perspective view a further embodiment of a seat assembly for a land vehicle, sea vessel or aircraft.

In the seat assembly 1a of FIG. 2 as well, a stable rectangular platform 2 is provided which can be displaced along its corner regions 7 by cables 9-12, anchored to the structural parts 8 of the vehicle, as well as positionally secured in the respective position to the cables 9-12. It can be seen, however, that now the cable sections 9a-12a, 9b-12b respectively, extending between the platform 2 and the structural parts 8 are directed towards the vertical centre axis MA. This bracing permits to position and secure the platform 2 in space by way of the bracing angles W between the cable sections 9a-12a, 9b-12b and the vertical line V in relation to the plane of the platform 2 as well as by the forces applied to the cable sections 9a-12a, 9b-12b the vectors VE of which intersect at a reference point RP. The reference point RP results from the point of intersection of the axes A and AA of the platform 2. Each cable section 9a-12a, 9b-12b may adopt a different bracing angle W in relation to the platform 2 as long as the basic direction of all cable sections 9a-12a, 9b-12b is adhered to.

The embodiment of a platform 2, shown schematically in FIG. 3, shows a level-adjusting device 13 with the aid of which the platform 2 can be displaced parallel to itself in upward or downward direction. It comprises four shafts 14 arranged crosswise and pivotally in the platform 2, said shafts being coupled at their inner ends via a bevel gear mechanism 15. A crank mechanism 16 is provided on the outer extremity of a shaft 14. The cables 9-12 are looped once or several times around the shafts 14 in the vicinity of the outer extremities of the shafts 14. When the crank mechanism 16 is turned, all shafts 14 rotate uniformly so that the platform 2 is displaced along the cables 9-12 as a result thereof.

In the embodiment of a level-adjusting device 13a according to FIG. 4, two shafts 14 are pivotally mounted parallel to one another in a platform 2. The two shafts 14 are interconnected via a transmission 17. On the extremity of a shaft 14 projecting from the platform 2 a crank mechanism 16 is provided. The cables 9-12 pass vertically through the platform 2 and are looped around the end regions of the shafts 14. If the crank mechanism 16 is rotated, the platform 2 can be displaced parallel to itself in upward or downward direction.

This embodiment may, however, also be modified to the effect that no transmission 17 is provided, but that instead thereof both shafts 14 are provided with a crank mechanism 16. In this embodiment, if both crank mechanisms 16 are actuated accordingly, the inclination of the platform 2 can be changed so that the seat inclination may be adapted to the respective user.

Figure 5:
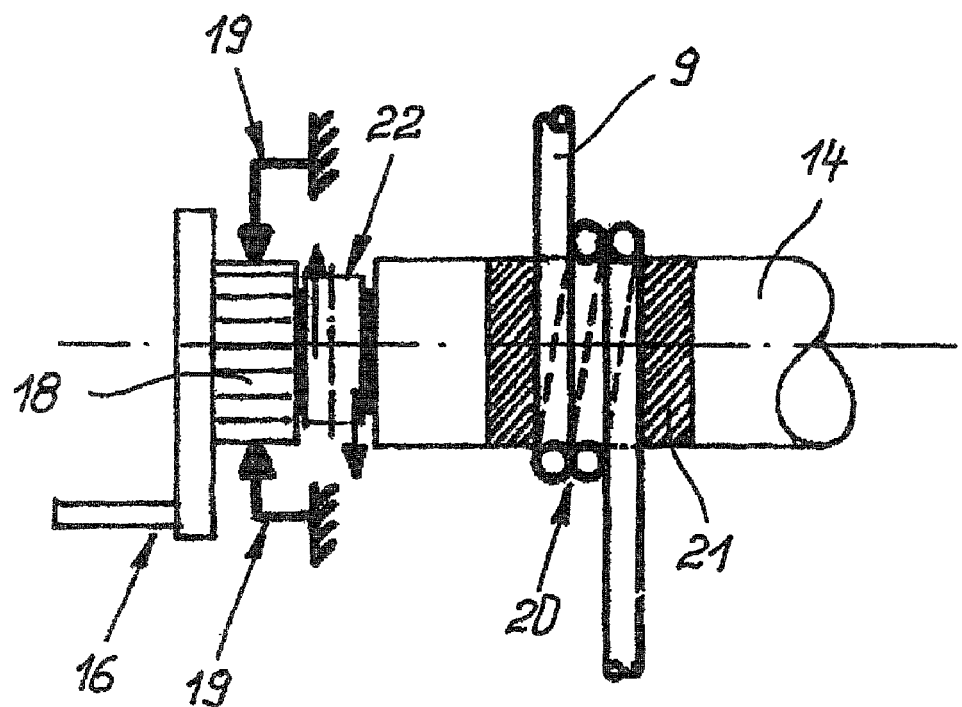
FIG. 5 a front view, on a larger scale, of detail V of the level-adjusting device of FIG. 4, together with an energy converter.

FIG. 5 illustrates schematically the region V of FIG. 4. It can be seen that the crank mechanism 16 is rigidly connected to a gear wheel 18. The gear wheel 18 may be secured by a blocking device 19, not shown in detail, in a desired position in relation to a platform in accordance with FIG. 1 or 2 or—as will still be elucidated—FIG. 7 or 8, respectively. The cable, for example cable 9, loops around the shaft 14. In the looping region 20 the shaft 14 is provided with a friction enhancing surface 21 so that the flow of forces between the cable 9 and the shaft 14 is improved. Between the shaft 14 and the gear wheel 18 an energy converter 22, not illustrated in detail, is provided which may, for example, be designed as a torsion bar converter.

The embodiment according to FIG. 5 may, of course, also be used in the embodiment of FIG. 3.

Figure 6:
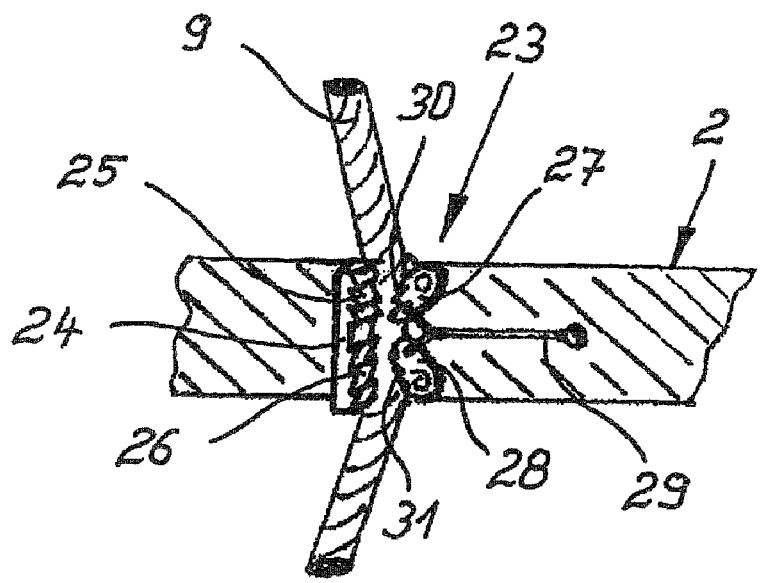
FIG. 6 in a schematic view, partially in section, a clamping/release means for the seat assemblies of FIGS. 1 and 2.

From FIG. 6 the principle of a clamping/release means 23 for a platform 2 is apparent. On the one side of a cable, for example cable 9, a toothed counter-bearing 24 can be seen. In the upper region the counter-bearing 24 comprises downwardly-pointing teeth 25 and in the lower region upwardly-pointing teeth 26. On the other side of the cable 9 two pivotal, toothed clamping members 27, 28 are provided, which are coupled to a release unit 29. The release unit 29 is so designed that it can be used to release the clamping members 27, 28 individually from the cable 9. If, for example, the platform 2 is to be displaced in upward direction, the upper clamping member 27 is released from the cable 9, while the lower clamping member 28 is released from the cable 9 when the platform 2 is displaced in downward direction. It can further be seen that according to the respective direction of displacement the teeth 25, 26 on the counter-bearing 24 and the teeth 30, 31 on the clamping members 27, 28 are orientated identically.

Figure 7:
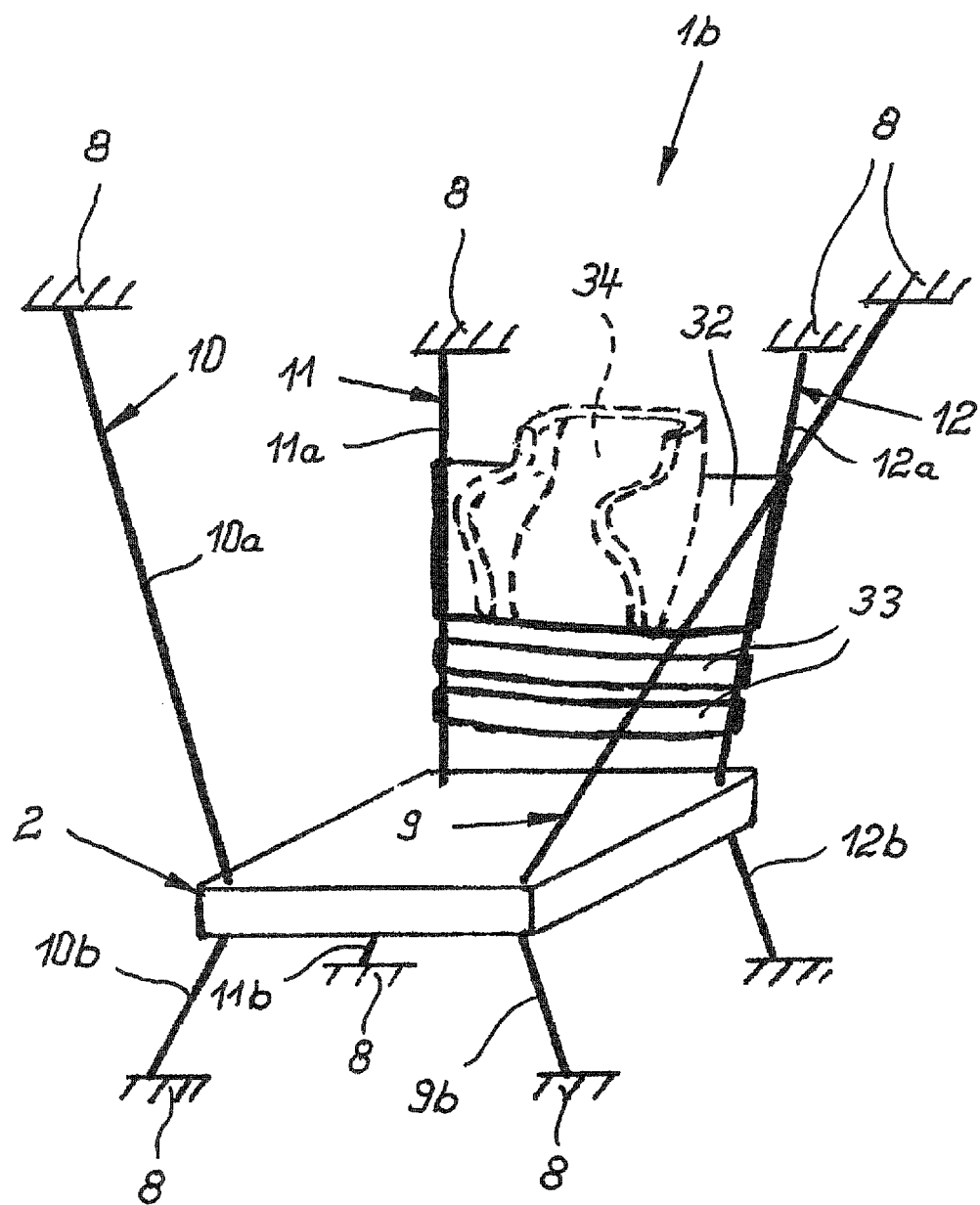
FIG. 7 in a schematic perspective view a third embodiment of a seat assembly for a land vehicle, sea vessel or aircraft.

The seat assembly 1b apparent from FIG. 7 schematically shows a platform 2, designed directly as a seat, which can be displaced along cables 9-12, anchored to structural parts 8 of the vehicle, as well as positionally secured to the cables 9-12 in a prevailing position in the manner already described above. The cable sections 9a-12a and 9b-12b above and beneath the platform 2 are directed away from the platform 2.

Between the rearward cable sections 11a, 12a, viewed in the direction of movement of the vehicle, located above the platform 2, a large-surface textile back bracing 32 is provided in the back region. Beneath this back bracing 32 two, in comparison, narrower, belt-like pelvic bracings 33 are located which serve to support the pelvic- and kidney regions of a user.

FIG. 7 further shows by dashed lines that instead of the back- and pelvic bracings 32, 33 a shell-like molded part 34 of ergonomic and/or safety-promoting design, adapted to the back region of a user, may be provided between the rearward cable sections 11a, 12a, viewed in the direction of movement of the vehicle, located above the platform 2.

Figure 8:
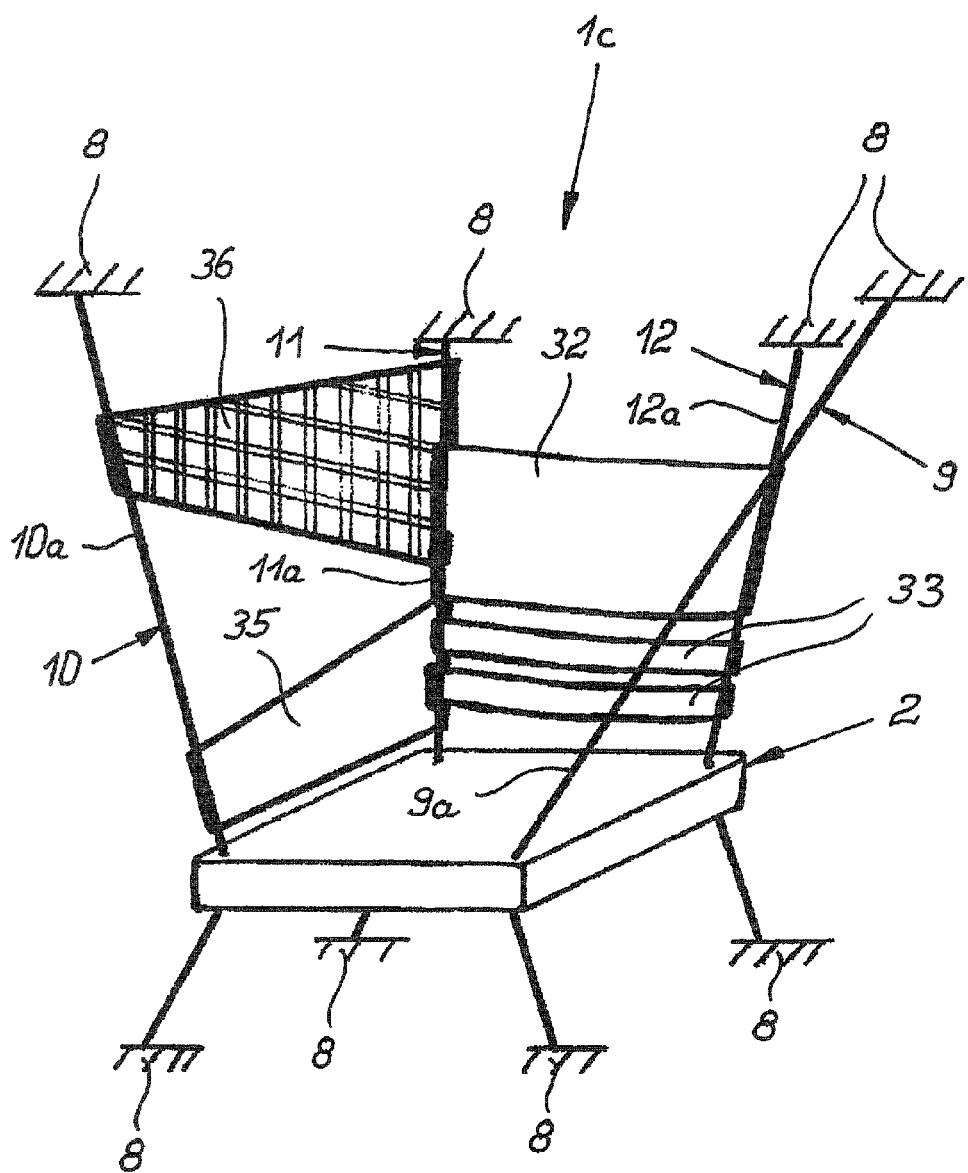
FIG. 8 in a schematic perspective view a fourth embodiment of a seat assembly for a land vehicle, sea vessel or aircraft.

The seat assembly 1c according to FIG. 8 corresponds initially to the seat assembly 1b according to FIG. 7 as regards the platform 2, the orientation of the cables 9-12 as well as the back- and pelvic bracings 32, 33.

In addition, however, it can further be seen that for the lateral support of a user textile pelvic- and shoulder bracings 35, 36 are provided between the lateral, successive cable sections 10a, 11a, viewed in the direction of movement of the vehicle, provided above the platform 2. These serve to support the pelvic region as well as the shoulder and head regions. The shoulder bracing 36 is designed like a net and permits a laterally-directed view as well as easier communication with other passengers. FIG. 8 shows only one respective pelvic- and shoulder bracing 35, 36. It goes without saying that on the other side as well such pelvic- and shoulder bracings 35, 36 may be provided between the upper cable sections 9a and 12a.

FIG. 9, in a basic side elevation, illustrates a footrest 37 for a user B, arranged upstream of a platform 2, viewed in the direction of movement of a vehicle. The footrest 37 is adapted to the foot region of the user B and is supported by cables 38 anchored to structural parts 8 of the vehicle. In this context, it is conceivable that the footrest 37 is likewise height- and/or inclination-adjustable. The cables 38 may extend in space according to the embodiments of FIG. 1, 7 or 8.

FIG. 10 shows a platform-like footrest 37a. This footrest 37a is anchored to a structural part 8 of a vehicle by an upwardly-directed vertical cable 39 and is anchored to structural parts 8 of the vehicle via four further downwardly-directed cables 41 fitted to the corner regions 40.

For the embodiments of FIGS. 9 and 10 integrated level-adjusting devices 13, 13a are conceivable as have been elucidated with reference to FIGS. 3 to 6.

What is claimed is:

1. A seat assembly for a vehicle selected from the group consisting of a land vehicle, a sea vessel, and an aircraft, comprising:
 a vertically adjustable seat passing underneath the buttocks of a user;
 a plurality of flexible connections in the form of cables disposed between the seat and structural parts of the vehicle and anchored to the structural parts,
 wherein the seat forms a component of a platform, which is displaceable along the cables and fixable in place on the cables to thereby define in relation to the platform upper and lower sections of said cables which extend between the platform and the structural parts in such a manner as to be directed towards or away from a vertical centre axis of the platform; and
 at least one level-adjusting device integrated into the platform to guide the cables.

2. The seat assembly of claim 1, further comprising energy converters provided in a longitudinal direction of the cables.

3. The seat assembly of claim 2, further comprising load-reacting sensors acting on the energy converters and integrated in the seat or anchoring points of the cables on the structural parts.

4. The seat assembly of claim 1, wherein the level-adjusting device is actuatable manually or by an electric or hydraulic drive mechanism.

5. The seat assembly of claim 1, further comprising an energy converter integrated into the level-adjusting device.

6. The seat assembly of claim 1, further comprising a clamping/release mechanism arranged on the platform and operatively connected with the cables.

7. The seat assembly of claim 1, further comprising textile back and pelvic bracings provided between rearward ones of the upper cable sections, as viewed in a direction of movement of the vehicle.

8. The seat assembly of claim 1, further comprising a molded part configured to complement a user's back region and provided between rearward ones of the upper cable sections, as viewed in a direction of movement of the vehicle.

9. The seat assembly of claim 1, further comprising textile pelvic and shoulder bracings provided between lateral, successive ones of the upper cable sections, as viewed in a direction of movement of the vehicle.

10. The seat assembly of claim 9, wherein the shoulder bracings are configured in form of a net.

11. The seat assembly of claim 1, wherein the seat is designed Previously presented and adjustable on the platform in a direction of movement of the vehicle, said seat being securable in an adjusted position.

12. The seat assembly of claim 11, wherein the seat is level-adjustable.

13. The seat assembly of claim 11, wherein the seat is transversely adjustable on the platform.

14. The seat assembly of claim 1, wherein the seat includes a backrest with adjustable inclination.

15. The seat assembly of claim 1, further comprising a footrest disposed anteriorly of the platform, as viewed in a direction of movement of the vehicle, and cables anchored to structural parts of the vehicle, said footrest being supported by the cables in a level-adjustable and/or inclination-adjustable manner.

16. The seat assembly of claim 1, wherein the seat is equipped with restraining belts.

* * * * *

UNITED STATES PATENT AND TRADEMARK OFFICE
CERTIFICATE OF CORRECTION

PATENT NO. : 8,317,262 B2
APPLICATION NO. : 12/681029
DATED : November 27, 2012
INVENTOR(S) : Carl-Jürgen Schroth et al.

It is certified that error appears in the above-identified patent and that said Letters Patent is hereby corrected as shown below:

Column 8, Claim 11, line 2: Please delete "Previously presented".

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,317,262 B2  
APPLICATION NO. : 12/681029  
DATED : November 27, 2012  
INVENTOR(S) : Carl-Jürgen Schroth et al.

Page 1 of 1

It is certified that error appears in the above-identified patent and that said Letters Patent is hereby corrected as shown below:

In the Claims

Column 8, line 42 (Claim 11, line 2) Please delete "Previously presented".

This certificate supersedes the Certificate of Correction issued April 2, 2013.

Signed and Sealed this  
Twenty-third Day of April, 2013

Teresa Stanek Rea  
*Acting Director of the United States Patent and Trademark Office*